United States Patent

Van Mullekom

[11] Patent Number: 5,957,466
[45] Date of Patent: Sep. 28, 1999

[54] MACHINE CHUCK

[75] Inventor: Arnoldus P. Van Mullekom, New South Wales, Australia

[73] Assignee: Advanced Diagnostic Development Pty Ltd., New South Wales, Australia

[21] Appl. No.: 08/929,239

[22] Filed: Sep. 4, 1997

[51] Int. Cl.[6] ....................................................... B23B 5/22
[52] U.S. Cl. ........................................... 279/4.12; 279/114
[58] Field of Search ..................................... 279/4.12, 114

[56] References Cited

U.S. PATENT DOCUMENTS

| | | |
|---|---|---|
| 1,628,476 | 5/1927 | Sloan . |
| 2,588,938 | 3/1952 | Rogers ..................................... 279/114 |
| 2,725,236 | 11/1955 | Skillin ..................................... 279/116 |
| 3,028,169 | 4/1962 | Skillin ..................................... 279/114 |
| 4,401,308 | 8/1983 | Sakaguchi et al. ..................... 279/114 |

FOREIGN PATENT DOCUMENTS

25517/77  11/1978  Australia .

Primary Examiner—Andrea L. Pitts
Assistant Examiner—Monica Smith
Attorney, Agent, or Firm—McAndrews, Held & Malloy, Ltd.

[57] ABSTRACT

A machine chuck (10) having a base (13) to be rotated about a longitudinal axis. Jaw members (20) move relative to the base (13) and radially with respect to the axis. A scroll member (18) is mounted on the base for angular movement relative thereto, which scroll member (18) engages the jaws (20) to cause the radial movement thereof. The base (13) has an annular passage which receives pistons (17) attached to the scroll member 18. Fluid under pressure delivered to the passage (16) causes angular movement of the pistons (17) and therefore scroll member (18) relative to the base (13). This angular movement causes radial movement of the jaw members (20).

6 Claims, 4 Drawing Sheets

MACHINE CHUCK

TECHNICAL FIELD

The present invention relates to machine chucks and more particularly to pneumatically or hydraulically powered chucks.

BACKGROUND OF THE INVENTION

Known chucks have the disadvantage of being limited in respect of minimum range of the workpiece size. Frequently the problem is addressed by the use of different sized chucks, which is expensive.

Previously known chucks also suffer from the disadvantage of being axially thick and therefore support the workpiece a considerable distance from the supporting bearings. Still further the chucks are expensive to manufacture.

A still further disadvantage is that they are not adapted to receive small workpieces.

OBJECT OF THE INVENTION

It is the object of the present invention to overcome or substantially ameliorate the above disadvantages.

SUMMARY OF THE INVENTION

There is disclosed herein a machine chuck comprising:

a base to support a workpiece relative to a longitudinal axis of the chuck;

a scroll member mounted on the base for angular movement relative thereto about said axis;

a piston attached to said scroll member;

a plurality of jaw members mounted on the base to engage the workpiece, the jaw members being movable relative to the base in a direction generally radial of said axis, each jaw member being engaged with said scroll member so that angular movement between the scroll member and the base causes radial movement of the jaw members; and wherein said base provides an arcuate passage extending angularly about said axis, which passage receives said piston so that a fluid under pressure delivered to said passage causes angular movement of said scroll member to radially move the jaw members.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
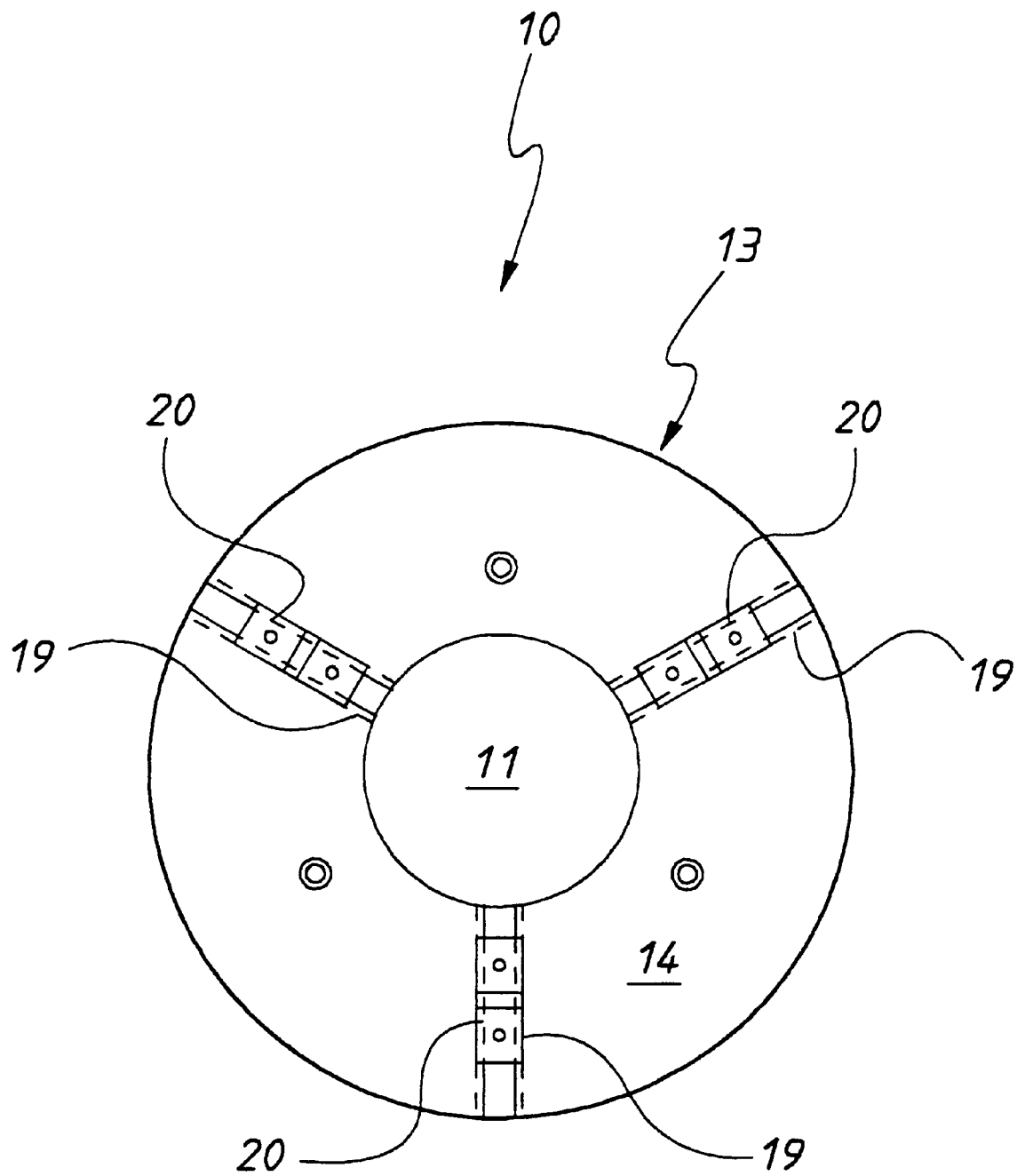
FIG. 1 is a schematic front elevation of a machine chuck.
Figure 2:
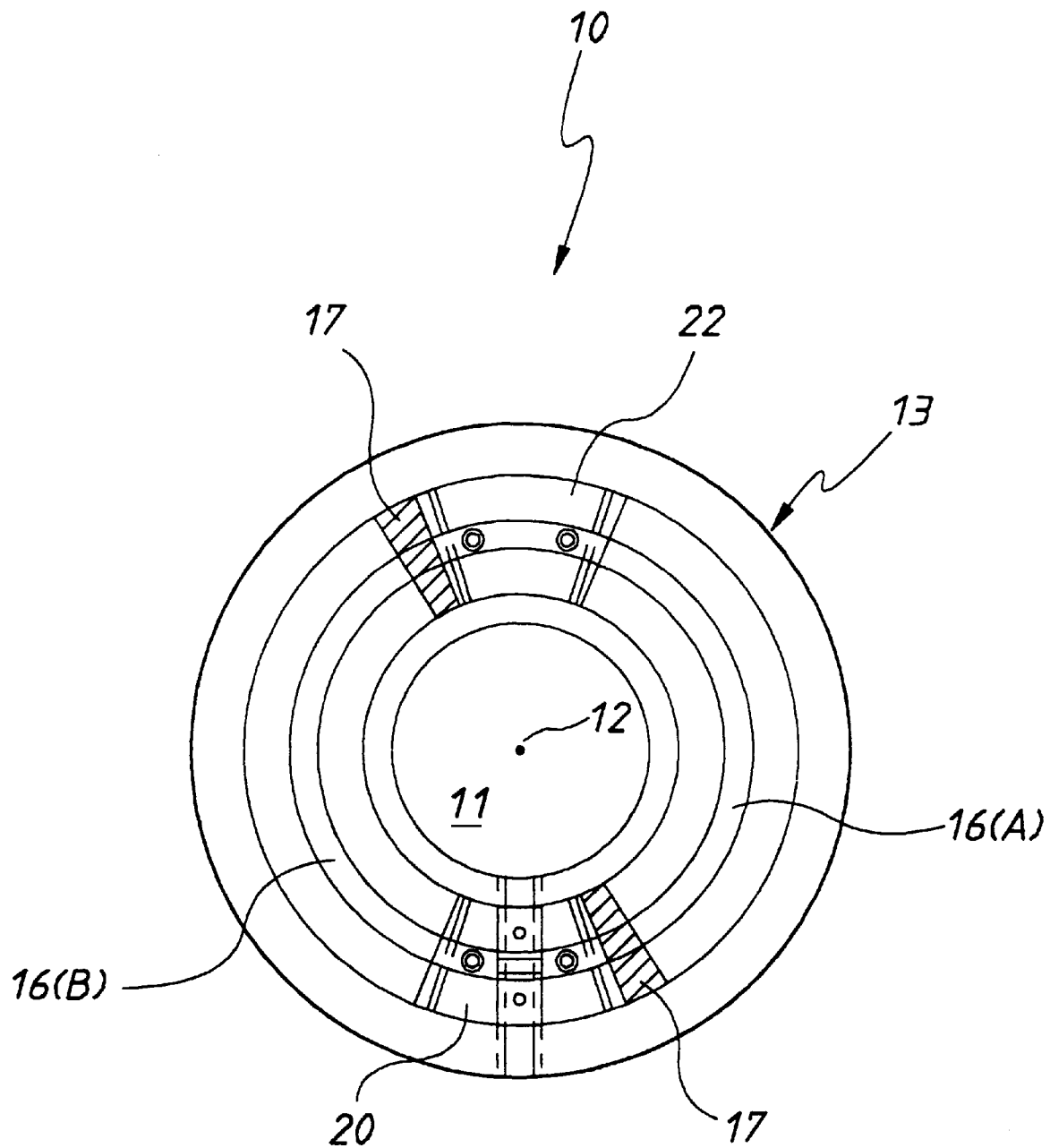
FIG. 2 is a schematic rear elevation of the chuck of FIG. 1.
Figure 3:
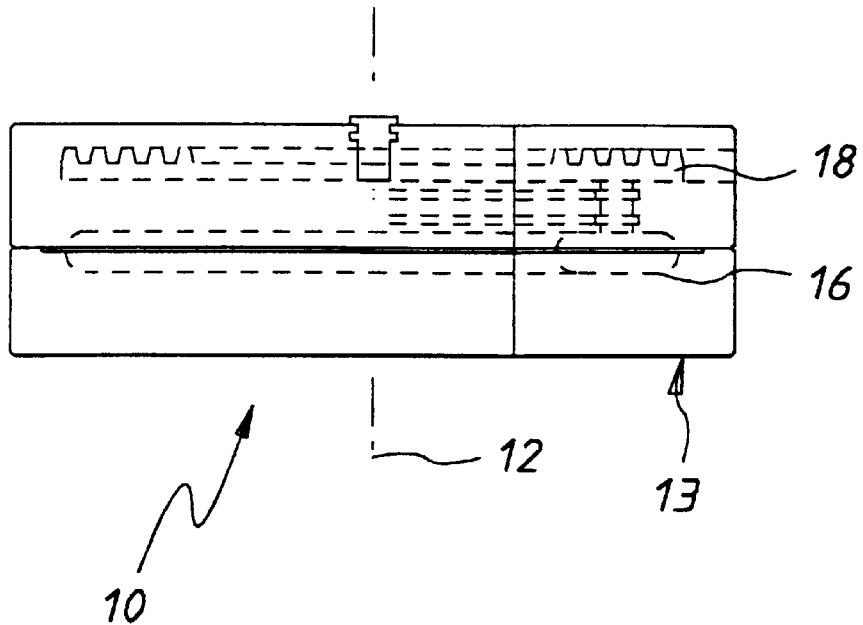
FIG. 3 is a schematic plan view of the chuck of FIG. 1.
Figure 4:
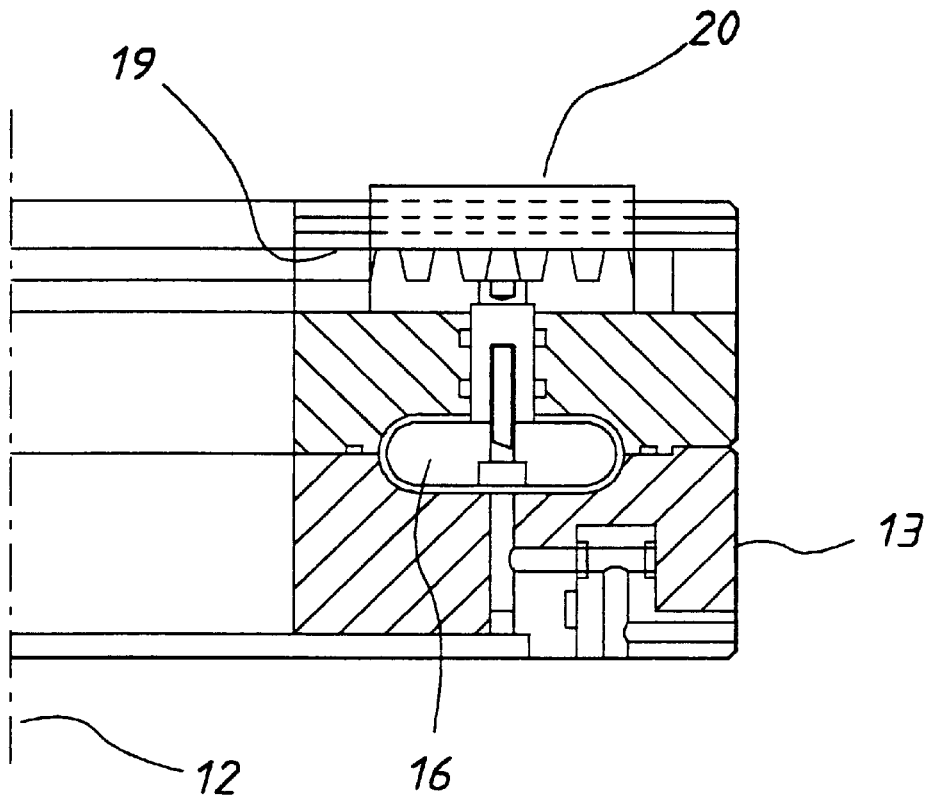
FIG. 4 is a schematic part sectioned segment view of the chuck of FIG. 1.
Figure 5:
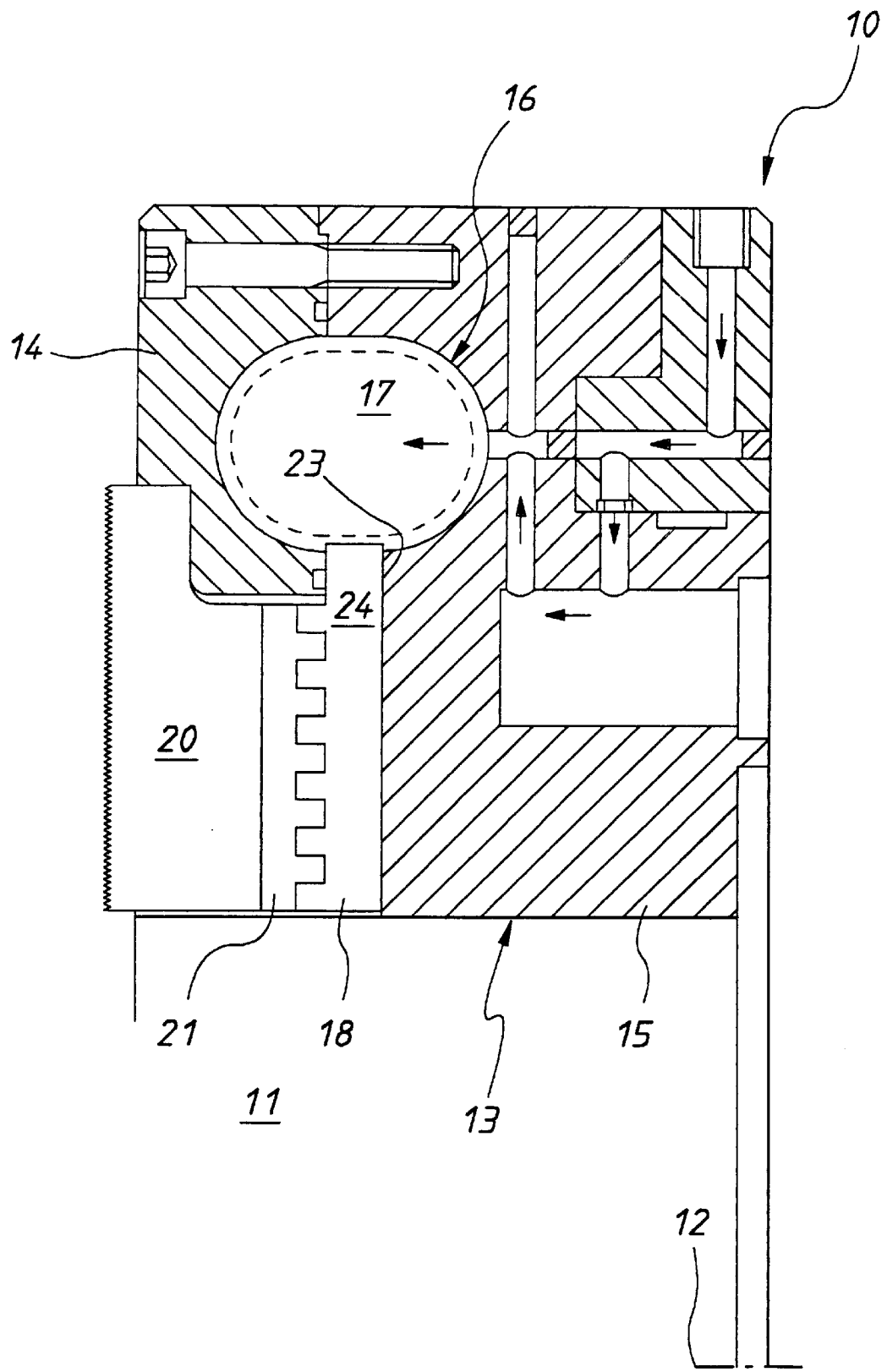
FIG. 5 is a schematic enlarged view of the chuck portion illustrated in FIG. 4.

In the accompanying drawings there is schematically depicted a machine chuck 10. The chuck 10 receives and secures a workpiece in position, which workpiece may project into the central aperture 11. When the chuck 10 is used for turning, the chuck 10 is rotated about the longitudinal axis 12 of the chuck 10. When the chuck 10 is used on a milling table it is not rotated.

The chuck 10, in this example, has a base 13 which is of an annular configuration and is rotatably driven about the axis 12. The base 13 includes a body 15 and a cap 14, both of which are of an annular configuration. The cap 14 and body 15 cooperate to provide an annular passage (cavity) 16 within which there are located two or more pistons 17. The cap 14 and body 15 each provide an annular part of the passage 16. The pistons 17 are attached to a scroll spiral member 18. The pistons 17 and member 18 are movable angularly about the axis 12 relative to the base 13. By delivering a fluid under pressure to the passage 16 the piston 17 are moved angularly taking with them the scroll member 18.

Extending from the annular passage 16 is an annular slot 23 through which the pistons 17 are connected to the scroll member 18 by an annular bridge portion 24.

The cap 14 is provided with radially extending slots 19 which guidably receive and retain jaw members 20. Jaw members 20 have a scroll spiral portion 21 matingly engaged with the scroll member 18 so that upon angular movement of the scroll member 18 about the axis 12, the jaw members 20 are caused to move radially relative to the axis 12 to engage or release the workpiece.

The passage 16 is divided into two segments 16(A) and (B) by means of dividers 22 which have a series of passages communicating with the passage 16 to deliver the fluid under pressure to the appropriate sides of the pistons 17. The passages in the dividers 22 communicate with a spool valve assembly which controls the flow of the fluid under pressure and exhaust fluid from the passage 16.

It should be appreciated that the fluid delivered to the passage 16 may be a gas or a liquid such as air or pneumatic fluid.

I claim:

1. A machine chuck comprising:

a base to support a workpiece relative to a longitudinal axis of the chuck;

a scroll member mounted on the base for angular movement relative thereto about said axis;

a piston attached to said scroll member;

a plurality of jaw members mounted on the base to engage the workpiece, the jaw members being movable relative to the base in a direction generally radial of said axis, each jaw member being engaged with said scroll member so that angular movement between the scroll member and the base causes radial movement of the jaw members; and wherein said base provides an arcuate passage extending angularly about said axis, which passage receives said piston so that a fluid under pressure delivered to said passage causes angular movement of said scroll member to radially move the jaw members.

2. The machine chuck of claim 1, wherein said base provides said annular passage, and said scroll member is attached to said piston.

3. The machine chuck of claim 2, wherein said base comprises a body and a cap, each providing an annular part of said passage.

4. The machine chuck of claim 3 further including an annular slot extending from said passage and through which a bridge portion connects said piston to said scroll member.

5. The machine chuck of claim 4 wherein a further piston is located in said passage, said chuck further including a plurality of slots formed in said base, each slot receiving a respective one of the pistons, with the slot acting to guide the pistons radially with respect to said axis upon angular relative movement between the scroll member and base.

6. The machine chuck of claim 5 wherein the chuck is adapted to be rotatably driven.

* * * * *